United States Patent Office 3,574,094
Patented Apr. 6, 1971

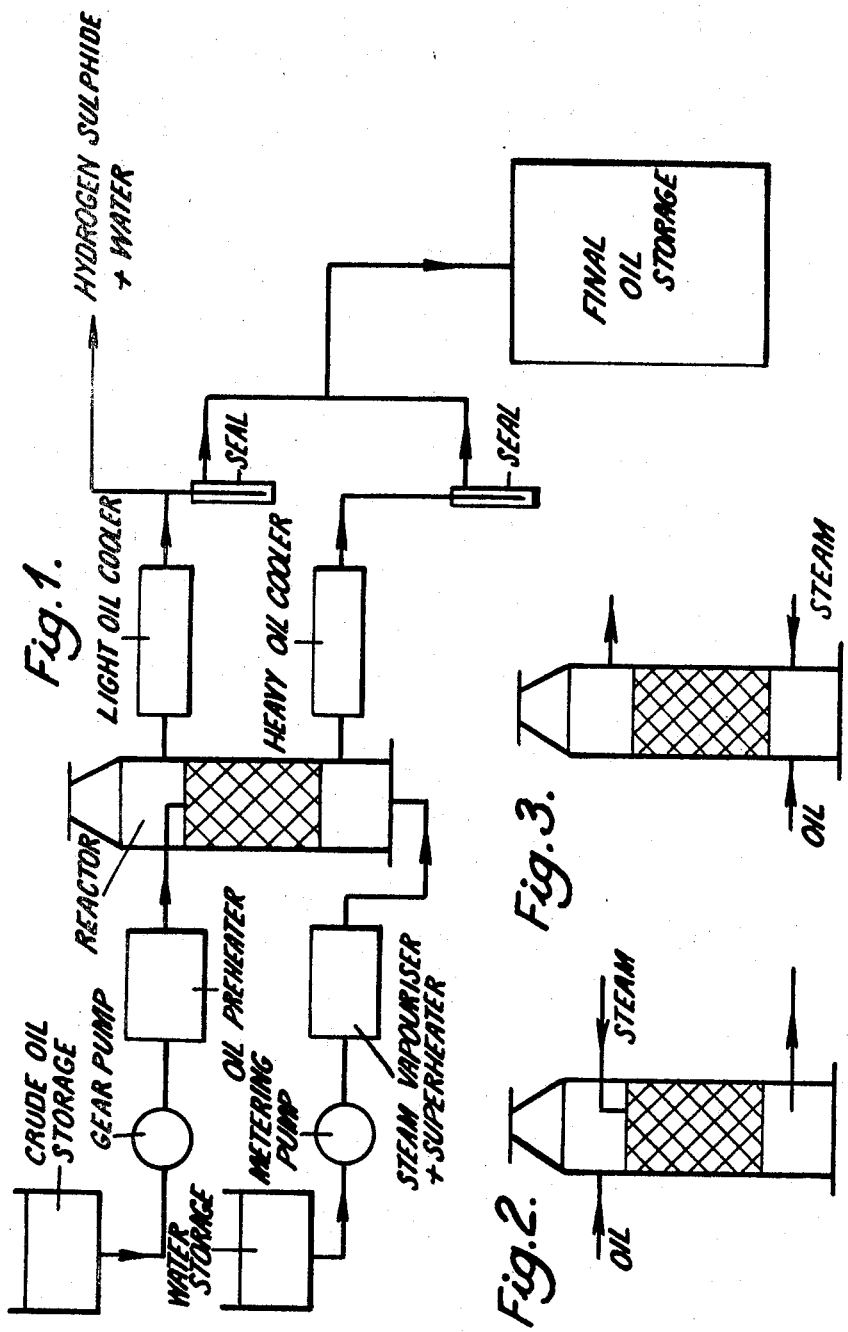

3,574,094
DESULPHIDING A LIQUID WITH STEAM AND
URANIUM OXIDE CATALYST
Thomas Nicklin, Manchester, and Frederick Farrington, Sale, England, assignors to The Gas Council, London, England
Filed June 20, 1968, Ser. No. 738,456
Int. Cl. C10g 23/14
U.S. Cl. 208—214                     5 Claims

ABSTRACT OF THE DISCLOSURE

Desulphiding of liquid pertoleum fraction is effected by contacting the fraction in the liquid state with steam and with a catalyst of uranoso-uranic oxide and/or uranium trioxide. The steam and liquid fraction are passed co-currently upward or counter-currently through the catalyst in the reactor vessel. Alternately the liquid fraction may pass into the reactor at the level of the catalyst whilst steam is passed upward through the catalyst. A vaporized mixture is removed from an upper portion of the reactor while a desulphurized liquid fraction is removed from the lower part of the reactor.

---

This invention relates to a process for the removal of organic sulphur compounds from organic compounds such as oils.

In a number of processes in the chemical and petroleum industry, it is highly desirable or even essential that the sulphur content of the new hydrocarbon feedstocks employed in the process, are reduced to a low level. The conventional methods of desulphiding include acid washing where the sulphur content is very high, and desulphiding with hydrogen over a catalyst, possibly consisting of nickel.

Heretofore a process has been devised whereby organic sulphur compounds are removed from hydrocarbons in the vapour phase, wherein the hydrocarbons are heated with steam at temperatures above 350° C. in the presence of a catalyst which comprises uranoso-uranic oxide $U_3O_8$, sometimes known as triuranium octaoxide, and a support comprising alumina. The hydrogen sulphide formed in the reaction may be collected and removed by methods known in the art, such as by washing with an aqueous solution of sodium vanadate and the sodium salt of anthraquinone disulphonic acid. Alternatively the hydrogen sulphide may be removed by the use of zinc oxide in, say, pellet form.

It has since been found that uranium trioxide is also a suitable constituent for the catalyst for use in the above mentioned process.

While vapour phase desulphiding as described above is quite suitable for desulphiding those feedstocks having relatively low boiling points, problems arise where the boiling point of the fraction is high or where the organic compounds involved decompose before vapourising.

According to the invention there is provided a process for removing organic sulphur compounds from liquid organic compounds such as oils which process comprises introducing the organic compound or mixture of organic compounds in the liquid phase together with steam into the presence of a catalyst composition comprising uranoso-uranic oxide and/or uranium trioxide.

The term "uranoso-uranic oxide" is used herein to refer to the mixed oxide $U_3O_8$, which is also referred to in some publications as triuranium octaoxide (see for example "Handbook for Chemical Society Authors" page 22, published by the Chemical Society in 1960).

Preferably the catalyst composition further comprises a catalyst carrier such as alumina. Other suitable carriers will be known by those skilled in the art. A binding agent such as alumina cement may also be incorporated to advantage.

While the uranium content of the catalyst composition is not critical, a content of from 5 percent to 20 percent or from 5 percent to 10 percent by weight of uranium in relation to the total weight of the catalyst are preferred.

The formation of the catalyst compositions for use in the process of the present invention may involve the decomposition of a uranium oxide precursor i.e. a uranium compound which will decompose to the oxide on heating or under the conditions of the process of the invention. Examples of such compounds are many and include uranyl nitrate and carboxylic acid salts of uranium e.g. uranium acetate. If the latter is decomposed under controlled conditions at a temperature below 650° C. more active compositions may be obtained, especially if the rate of temperature rise is very gradual, say 2° C. per minute.

The catalyst composition may be in the form of spheres. Where it is required to have high counter-current flow of liquid and vapour phases whilst maintaining a large solid surface area wetted by the liquid and efficient mixing of the phases the catalyst support can be shaped in the form of "rings" or hollow cylinders or "saddle" such as have been found effective in distillation practice.

The size of the rings is preferably of the order of 17 mm. outside diameter with a hole diameter of 10 mm.

There are several ways in which the process of the invention may be carried out. According to one embodiment of the invention the liquid organic compound or compounds are introduced into a reactor vessel containing the catalyst or catalyst composition, at a level above that of said catalyst or catalyst composition, whilst steam is passed upwardly through the reactor vessel. From the upper portion of the reactor vessel is extracted that fraction of the organic compound or compounds which has vapourised in the reactor vessel, and from the lower portion the fraction of the organic compound or compounds which is still in the liquid form.

The vapour fraction is extracted together with steam and hydrogen sulphide. These may easily be removed in a stripper either, for example, by partial condensation of oil vapour, followed by separation of phases, and/or in a column of steam. It is found that considerable desulphiding of this fraction of the oil is obtained.

The liquid fraction also comes off with some hydrogen sulphide and steam, and may be in the form of a foam. When the water and hydrogen sulphide have been removed this fraction too is found to have been desulphided, although not to such a great extent as the vapour fraction. After collection, the two fractions may be combined again, or not, according to the use to which purified compounds are to be put.

The invention further comprises a process which includes introducing both steam and a liquid organic compound or compounds into a reactor vessel containing the catalyst or catalyst composition, at a level about that of the catalyst or catalyst composition and extracting from the lower portion of the reactor vessel the organic compound or compounds collecting there. The organic compounds may be drawn off together with hydrogen sulphide and steam in the form of a foam which collapses, allowing separation of the oil, steam and hydrogen sulphide on reduction of temperature.

The invention further comprises a process which includes introducing both steam and the liquid organic compound or compounds into a reactor vessel containing the catalyst or catalyst composition, at a level below that of said catalyst or catalyst composition and extracting the organic compound or compounds from the upper portion of the reactor vessel. The organic compounds may be extracted in the form of a foam which, as before, collapses, allowing the separation of the oil hydrogen sulphide on reduction of temperature.

It is also possible to carry out the process of the invention by introducing the organic compound or compounds into a reactor vessel containing the catalyst or catalyst composition, at the same level as that at which some of the catalyst or catalyst composition is situated, whilst steam is passed upwardly through the reactor vessel, and extracting from the upper portion of the reactor vessel, the fraction of the organic compound or compounds which has vapourised and extracting from the lower portion of the reactor vessel that fraction which is liquid.

It is preferred that subject to other temperature determining factors referred to later the temperature of the liquid organic compounds at the inlet into the reactor vessel is controlled so as to coincide with the temperature of the catalyst at the level of said inlet. Thus the incoming liquid does not interfere with the temperature gradient formed in the catalyst or catalyst composition in its capacity as a fractionating column.

The temperature range which is employed in the process will depend on various factors such as the composition of the organic compounds, the possibility of decomposition of the organic material, and the extent to which vapourisation is desired and may vary from 100° C. to 1000° C. However it is preferred that the temperatures in the reactor vessel are from 270° C. to 450° C.

It is to be understood that the invention further comprises any organic compounds purified by the processes of the invention.

In order that the invention may be more fully understood, the process of the invention are illustrated by the following specific examples but are not limited thereto.

EXAMPLE I

FIG. I illustrates in diagrammatic form the apparatus involved in the process of the example. From a storage tank the crude oil containing 2.4% sulphur is pumped at at a rate of 55 lbs. per hour into a preheater, heated to a temperature of about 290° C. (e.g. 280° C. to 300° C.) and introduced into the upper portion of a reactor vessel containing a 2 ft. deep bed of 6 mm. spheres of a catalyst composition comprising alumina and oxides of uranium. Water was pumped from a storage tank at a rate of 15 lbs. per hour into a vapouriser and superheater, heated to a temperature of about 330° C. (e.g. 320° C. to 340° C.) and introduced into the lower portion of the reactor vessel. In the resulting desulphiding reaction, hydrogen sulphide was formed. The spheres of catalyst composition acted both as desulphiding catalysts and as fractionating elements.

The light oils vaporised under the conditions in the reactor and were extracted at a rate of 26 lbs. per hour from the top of the reactor, together with steam and hydrogen sulphide. The vapour was then liquified and passed through a stripper to remove the hydrogen sulphide and steam present. The sulphur content of the oil was found to be 0.72%.

From the bottom of the reactor was extracted at a rate of 30 lbs. per hour the heavier oils toegther with some water and hydrogen sulphide, either in the form of a solution or a foam. After cooling to condense the oil vapour, then separating this from the steam and hydrogen sulphide and stripping of water and hydrogen sulphide, the oil was found to have a sulphur content of 1.9%. If desired, the two fractions could then be combined, to form an oil of substantially the same composition, as the crude oil, merely the sulphur compounds having been removed.

EXAMPLE II

FIG. II shows in diagrammatic form the reactor vessel and the positions of the inlets and the outlet for use in the process of this example.

Into the top of a reactor containing a bed of catalyst composition as described in Example I was pumped oil containing 2.43% sulphur at a rate of 63 lbs. per hour and steam at a rate of 20 lbs. per hour. Both substances were preheated to a temperature of about 300° C. (e.g. from 290° C. to 310° C.)

The temperature gradient in the reactor ranged from 300° C. just above the catalyst to 380° C. (e.g. from 370° to 390° C.) just below the catalyst. The oil was drawn off together with steam and some hydrogen sulphide from the bottom of the reactor. After stripping the steam and hydrogen sulphide the oil was found to have a sulphur content of 1.47%.

EXAMPLE III

FIG. III shows in diagrammatic form the reactor vessel and the position of the inlets and the outlet for use in the process of this example.

Oil containing 2.4% sulphur was pumped into the lower portion of a reactor vessel containing a catalyst bed as described in Example I, at a rate of 40 lb. per hour, together with steam at a rate of 9 lbs. per hour. Both were preheated to about 300 C. (e.g. 290° C. to 310° C.) the temperature of the lowest part of the catalyst bed. The highest part of the catalyst bed was at a tempertaure of 210° C. (or 200° C. to 220° C.). The oil was extracted together with steam and hydrogen sulphide from the top of the reactor vessel. On being stripped of the steam and hydrogen sulphide, the oil was found to contain 1.54% sulphur.

EXAMPLE IV

Desulphiding using Corundum as a catalyst

As a comparative example a reactor containing a bed of 500 cc. of ¼" diameter Corundum spheres is maintained at a control temperature in a furnace. Oil is fed to the top of the bed from a burette via a pump. Water is pumped from a burette and after being heated to a temperature of 250 to 300° C. in a coil, the steam generated is passed to the bottom of the bed.

Counter-current flow takes place in the bed and the steam and light oil fraction leaves the top of the reactor and are condensed.

A small amount of gas leaving the condenser is passed to a solution of cadmium acetate to absorb hydrogen sulphide. Analysis of this solution gives a measure of the quantity of hydrogen sulphide produced.

The oil fraction is decanted from the mixed condensate.

The heavier oil fraction flows from the base of the reactor through a U tube seal and after cooling is mixed with a light fraction.

Two experiments were conducted using oil having a 2.4 percent sulphur content.

The results were as follows:

|  | Experiment 1 | Experiment 2 |
| --- | --- | --- |
| Water flow rate | 1.4 | 2.4 |
| Oil flow rate | 5.0 | 5.0 |
| Mean temperature of bed | 420° C. | 514° C. |
| Maximum temperature of bed | 435° C. | 590° C. |
| Removal of sulphur as percentage of oil | 0.15% | 0.26% |

We claim:
1. A process for removing organic sulphur compounds from a liquid petroleum fraction, which process comprises contacting said fraction in a reactor with steam and with a catalyst comprising at least one member of the group consisting of uranoso-uranic oxide and uranium trioxide, at a temperature in the range of from about 270° C. to 450° C., said fraction being introduced into said reactor at a level above that of said catalyst in said reactor whilst steam is passed upwardly through said catalyst, removing a vaporized petroleum fraction together with steam and hydrogen sulphide from the upper portion of said reactor and a desulphurized liquid fraction from the lower portion of said reactor.

2. A process for removing organic sulphur compounds from a liquid petroleum fraction, which process comprises contacting a mixture of steam and said fraction in a reactor with a catalyst comprising at least one member of the group consisting of uranoso-uranic oxide and uranium trioxide, at a temperature in the range of from about 270° C. to 450° C., said mixture being introduced into said reactor at a level below that of said catalyst in said reactor, removing a vaporized petroleum fraction together with steam and hydrogen sulphide from the upper portion of said reactor and a desulphurized liquid fraction from the lower portion of said reactor.

3. A process for removing organic sulphur compounds from a liquid petroleum fraction, which process comprises contacting said fraction in a reactor with steam and with a catalyst comprising at least one member of the group consisting of uranoso-uranic oxide and uranium trioxide, at a temperature in the range of from about 270° C. to 450° C., said fraction being introduced into said reactor at approximately the level of said catalyst in said reactor, passing steam upwardly through said catalyst, removing a vaporized petroleum fraction together with steam and hypdrogen sulphide from the upper portion of said reactor and a desulphurized liquid fraction from the lower portion of said reactor.

4. A process as claimed in claim 3 wherein the temperature of said fraction at the inlet to said reactor is maintained at the temperature of the catalyst in said reactor at the level of the inlet.

5. A process as claimed in claim 2, wherein the liquid petroleum fraction is crude oil; the steam and crude oil is preheated at 300° C.; the catalyst is in the shape of rings which consist essentially of alumina and said uranium oxide, and said vaporized petroleum fraction is withdrawn from the upper portion of the reactor at a temperature of from 200° C. to 220° C.

References Cited

UNITED STATES PATENTS 1,938,086   12/1933   Pier _____ 208—243

FOREIGN PATENTS

41/7,341   4/1966   Japan _____ 208—243

DELBERT E. GANTZ, Primary Examiner

G. J. CRASANAKIS, Assistant Examiner

U.S. Cl. X.R.

208—243